United States Patent
Boutaghou

[11] Patent Number: 6,055,134
[45] Date of Patent: Apr. 25, 2000

[54] COMBINED LOAD/UNLOAD RAMP AND SNUBBER FOR DISC DRIVES

[75] Inventor: Zine-Eddine Boutaghou, Vadnais Heights, Minn.

[73] Assignee: Seagate Technology, Inc., Scotts Valley, Calif.

[21] Appl. No.: 09/040,631

[22] Filed: Mar. 18, 1998

Related U.S. Application Data

[60] Provisional application No. 60/059,490, Sep. 22, 1997.

[51] Int. Cl.[7] .............................. G11B 5/54; G11B 33/08
[52] U.S. Cl. ...................................... 360/105; 360/97.02
[58] Field of Search .............................. 360/105, 97.02, 360/97.03, 133; 369/291

[56] References Cited

U.S. PATENT DOCUMENTS

| | | | |
|---|---|---|---|
| 4,433,410 | 2/1984 | Siryj et al. | 369/291 |
| 4,692,831 | 9/1987 | Suzuki | 360/133 |
| 4,782,417 | 11/1988 | Tanaka et al. | 360/133 |
| 4,837,651 | 6/1989 | Tanaka et al. | 360/133 |
| 4,863,031 | 9/1989 | Tanaka et al. | 360/133 |
| 4,933,785 | 6/1990 | Morehouse et al. | 360/105 |
| 5,422,770 | 6/1995 | Alt | 360/105 |
| 5,757,587 | 5/1998 | Berg et al. | 360/105 |
| 5,801,899 | 9/1998 | Genheimer | 360/97.02 |
| 5,870,255 | 2/1999 | Hornung et al. | 360/105 |

*Primary Examiner*—Craig A. Renner
*Attorney, Agent, or Firm*—Kinney & Lange, P.A.

[57] ABSTRACT

A load/unload ramp includes a ramp surface for engaging the actuator arm to lift the transducer from operational relation to the disc surface, and a snubbing mechanism to prevent an edge of the disc from axially moving beyond a design limit. The snubbing mechanism includes an engaging mechanism for engaging the disc when the edge of the disc moves the design limit; the engaging mechanism operating to engage the disc without affecting the recording surface. In one form, the snubbing mechanism includes a slot to receive an edge of the disc. The engaging mechanism is supported within the slot to engage the disc, such as a chamfer surface between the edge and the recording surface, when the edge of the disc moves the design limit.

15 Claims, 3 Drawing Sheets

COMBINED LOAD/UNLOAD RAMP AND SNUBBER FOR DISC DRIVES

CROSS-REFERENCE TO RELATED APPLICATION(S)

This application claims priority from U.S. Provisional Application Ser. No. 60/059,490 filed Sep. 22, 1997 for "LOAD/UNLOAD RAMP DESIGN FOR MINIMIZING DISC DAMAGE DURING RAMP-DISK CONTACT" by Zine-Eddine Boutaghou.

BACKGROUND OF THE INVENTION

This invention relates to ramp designs for loading and unloading a transducer to an operational relation to a recording surface of a rotatable disc.

Magnetic disc drives employ one or more discs, each having one or two recording surfaces. An actuator arm moves a transducer in an arcuate path between inner and outer tracks on each disc surface. When the disc drive is not in use, it is common to "park" the transducer at a predetermined position by operating the actuator arm to move the transducer to that position. In some designs, the "park" position of a transducer is at a selected region of a selected track on the disc surface where the transducer "lands" on the disc surface. When restarting the disc drive, aerodynamic characteristics of the head slider causes the slider to take off from the landed or park zone to a design flying height where the transducer is operational with the recording surface. Other types of disc drives employ a load/unload ramp design operable to engage the actuator arm carrying the transducer to restrain the transducer above the disc when the disc is stopped. While there are certain advantages to both types of parking techniques, the transducer ramp provides particular advantages during transportation of the disc drive by holding the transducer away from the disc surface so that sudden jolts or other shock to the disc drive do not cause the transducer to inadvertently "crash" into the disc surface, thereby causing damage to the disc and/or transducer.

Typically, the transducer ramp is located outside the outer peripheral edge of the discs and is moveable into the region of the discs to engage the transducer arm over an outer region of the discs. Also, typically, these devices include a snubber which restrains an edge of the disc from axially moving beyond a design limit. The snubbing device is typically a slotted mechanism which receives the outer edge of the disc and extends radially inward from the edge. The snubber includes surfaces spaced a small distance, such as about 1 mil, from the disc surface. During transit of the disc drive the snubbing device prevents the disc from axially moving beyond the design limit established by the snubber surfaces. However, if the surface of the slot engages the recording surface of the disc, damage may occur to the disc. There is a need, therefore, for an improved snubbing device for a load/unload ramp that will not injure the recording surface on the disc when the disc drive is subjected to shock.

BRIEF SUMMARY OF THE INVENTION

One form of the invention provides a ramp for loading and unloading a transducer into operational relation to a recording surface of a disc rotatable about an axis. The ramp includes a ramp surface for engaging the actuator arm supporting the transducer to lift the transducer from operational relation to the disc surface. A snubbing mechanism prevents an edge of the disc from axially moving beyond a design limit. The snubbing mechanism includes an engaging mechanism for engaging the disc when the edge of the disc moves the design amount; the engaging mechanism operating to engage the disc without affecting the recording surface.

In one embodiment, the disc includes a chamfer surface between the recording surface and its edge, and the engaging mechanism comprises a button protruding from a surface of the slot to engage the chamfer surface when the edge of the disc moves the design limit. In one form of this embodiment, the button is formed of an energy absorbent material.

In another embodiment, the engaging mechanism comprises a compliant layer in the slot arranged to engage the chamfer surface when the edge of the disc moves the design amount. In one form of this embodiment, the compliant layer is formed of an energy absorbent material.

In yet another embodiment, the engaging mechanism comprises an inert layer arranged to engage the recording surface when the edge of the disc moves the design amount.

In another embodiment, the ramp includes a housing having the ramp surface and the snubbing mechanism includes a slot in the housing adjacent the ramp surface. The edge of the disc is received in the slot and the actuator assembly is operable to move the arm to a first position to engage the ramp to lift the transducer and restrain it from engaging the recording surface. In the second position of the actuator arm, the transducer does not engage the ramp. The slot is sized relative to the disc so that the disc is loosely received in the slot and does not engage the slot during normal operation of the disc drive. The engaging mechanism is supported within the slot to engage the disc when the edge of the disc moves the design limit.

In a second form of the invention, a disc drive has at least one disc having at least one recording surface rotatable about a disc axis. An actuator assembly has at least one actuator arm with a transducer mounted to the actuator arm. The actuator assembly is operable to position the transducer adjacent selected locations on the recording surface. A load/unload ramp includes a ramp surface for engaging the actuator arm to lift the transducer from operational relation to the disc surface and a snubbing mechanism for preventing an edge of the disc from axially moving beyond a design limit. The snubbing mechanism includes an engaging mechanism for engaging the disc when the edge of the disc moves the design amount; the engaging mechanism operating to engage the disc without affecting the recording surface. Various embodiments of the engaging mechanism include an inert layer arranged to engage the recording surface of the disc, and a button or other device to engage a chamfer surface between the edge and recording surfaces of the disc. In some embodiments, the button or other device may be a compliant material, such as an energy absorbent material.

DETAILED DESCRIPTION OF THE PREFERRED EMBODIMENTS

Figure 1:
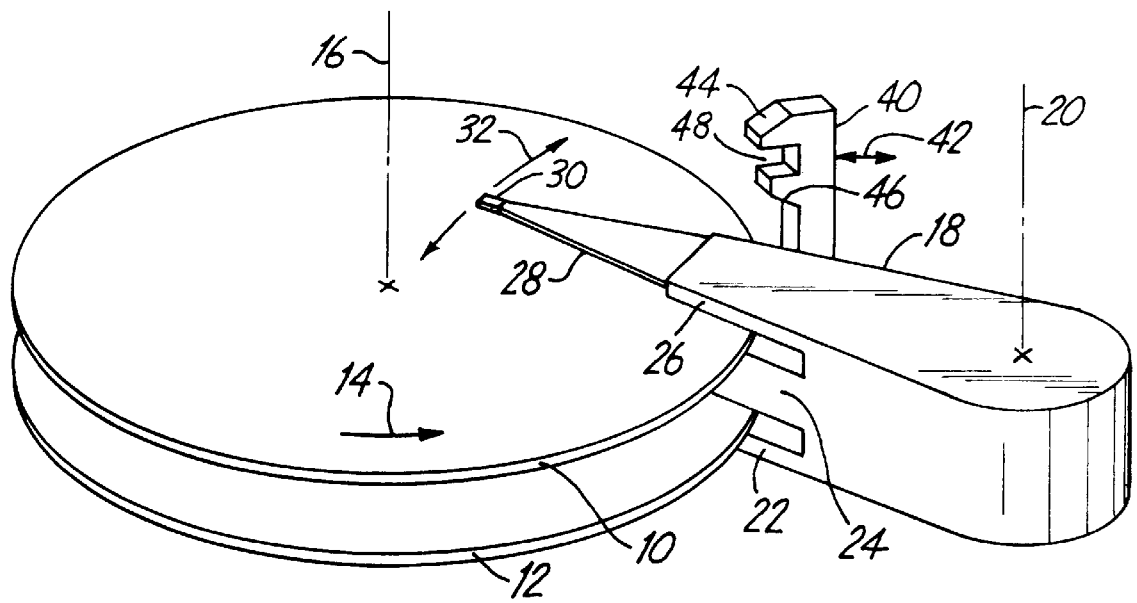
FIG. 1 is a perspective view of a disc drive having a plurality of discs, actuator assembly and load/unload ramp and snubbing device in accordance with the presently preferred embodiment of the present invention.

FIG. 1 illustrates a pair of magnetic recording discs 10 and 12 operable to rotate in the direction of arrow 14 about axis 16. E-block 18 is operable to rotate about axis 20. E-block 18 includes a plurality of actuator arms 22, 24 and 26 having, at their distal ends, one or two load beams 28. Each load beam supports a gimbal, slider and transducer assembly 30 in a manner well-known in the art. E-block 18 is operable to rotate about axis 20 to move the transducing assembly 30 in an arcuate path identified by arrow 32 between inner and outer tracks of the discs. A load/unload mechanism 40 is operable to radially reciprocate in the direction of arrow 42 so that ramp surfaces 44, 46 engage respective load beams 28 to bias the load beams above and away from the respective disc surface of discs 10 and 12. Alternatively, load/unload mechanism 40 is rigidly mounted to the frame of the disc drive so that the actuator arm 22, 24, 26 is operable to move the load beam, gimbal and slider to engage respective ramp surfaces 44, 46 to bias the heads above and away from the respective disc surface of discs 10 and 12. As is well-known in the art, for a disc drive having a stack of discs, there is one more actuator arm 22, 24, 26 than there are discs, and a separate load beam/gimbal/slider/head is employed for each disc surface. Hence, for the disc drive illustrated in FIG. 1, there are three actuator arms, 22, 24 and 26 and four load beam/gimbal/slider/head arrangements so that one load beam 28 is mounted to arm 26 to position a transducer 30 adjacent the upper surface of disc 10, two load beams are mounted to arm 24 to support transducers (not shown) adjacent the lower surface of disc 10 and the upper surface of disc 12, and one load beam and is mounted to actuator arm 22 to position a transducer adjacent the lower surface of disc 12.

Figure 2:
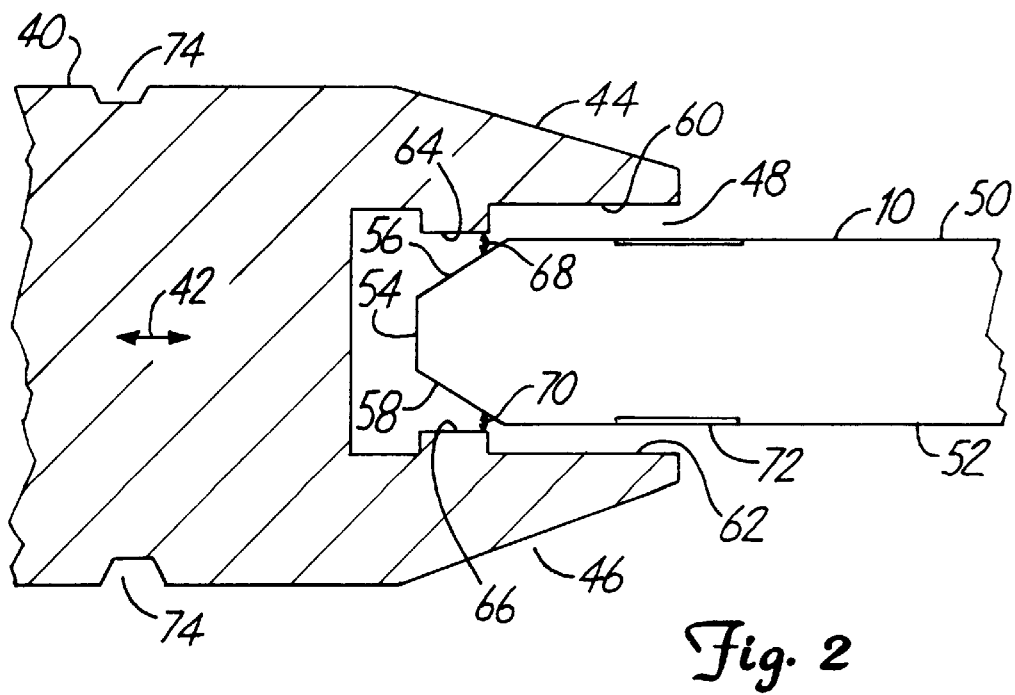
FIG. 2 is a side view of an edge region of a disc within a load/unload ramp and disc snubbing device in accordance with a first embodiment of the present invention.

Load/unload ramp mechanism 40 includes a snubber slot 48 arranged to surround the outer periphery and edge of each disc 10 and 12. FIGS. 2–6 are exploded section views of several embodiments of the snubber slot in accordance with the present invention. As shown in FIG. 2, disc 10 has an upper recording surface 50 and lower recording surface 52 with a vertical edge surface 54 defining the outer periphery of disc 10. Chamfer surface 56 is formed between edge 54 and recording surface 50, and chamfer 58 is formed between edge 54 and lower recording surface 52. Slot 48 includes an upper surface 60 and lower surface 62 each preferably spaced 2 to 3 mils from the respective recording surface 50 and 52 on disc 10. For a disc thickness of 32 mils, a slot width between surfaces 60 and 62 of about 37 mils is desirable. Buttons 64 and 66 extend from surfaces 60 and 62 at a location such that when the load/unload ramp 40 is in its innermost radial position with respect to axis 16, shown in FIGS. 2–6, buttons 64 and 66 confront chamfer surfaces 56 and 58. Buttons 64 and 66 have a height from respective surfaces 60 and 62 of about 2 to 3 mils each so that the minimum distance 68 and 70 between the buttons and the chamfer surfaces is about 1 mil each.

During normal operation of the disc drive, load/unload mechanism 40 is withdrawn radially from axis 16 so that the recording surfaces of disc 10 are outside of the slot 48. As a result, the transducing heads 30 (FIG. 1) on the actuator arms can access the outermost track 72 on each recording surface. When it is desired to park the transducer, member 40 is moved radially towards axis 16 to position the member as illustrated in FIG. 2, with the edge and peripheral portions of the disc surrounded by the walls of slot 48. In this position, E-block 18 may be rotated to move load beams 28 to engage the respective surfaces 44 and 46 of the ramp. As a result, the load beams and transducers supported by them are biased away from the confronting disc surface in a manner well known in the art. A latch mechanism (not shown) on the load beams engage detents 74 on member 40 to retain the load beams. As a result, the transducers are locked in a position and restrained from movement to avoid contact with the disc surface and to prevent damage to both the head and the disc. To disengage the load/unload mechanism, device 40 is simply withdrawn radially away from axis 16 in a manner well-known in the art. Typically, and as well-known in the art, discs 10 and 12 are rotated before withdrawing mechanism 40 to permit the heads to commence flying without contact to the disc surface.

If, while the transducers are in their park or locked position, a mechanical shock occurs to the disc drive that would axially move the edges of discs 10 and 12 beyond the design limit defined by spaces 68 and 70 (e.g., one mil) between the buttons 64 and 66 and the chamfer edges 56 and 58, one or both of chamfer surfaces 56 and 58 on the discs engage the respective button 64 or 66 to thereby absorb the shock and prevent the recording surface 50 or 52 from engaging surface 60 or 62 of the snubber. As a result, contact between the disc and the snubber is localized at the chamfer edges of the discs and the recording surfaces of the discs are protected from damage by the snubber.

Figure 3:
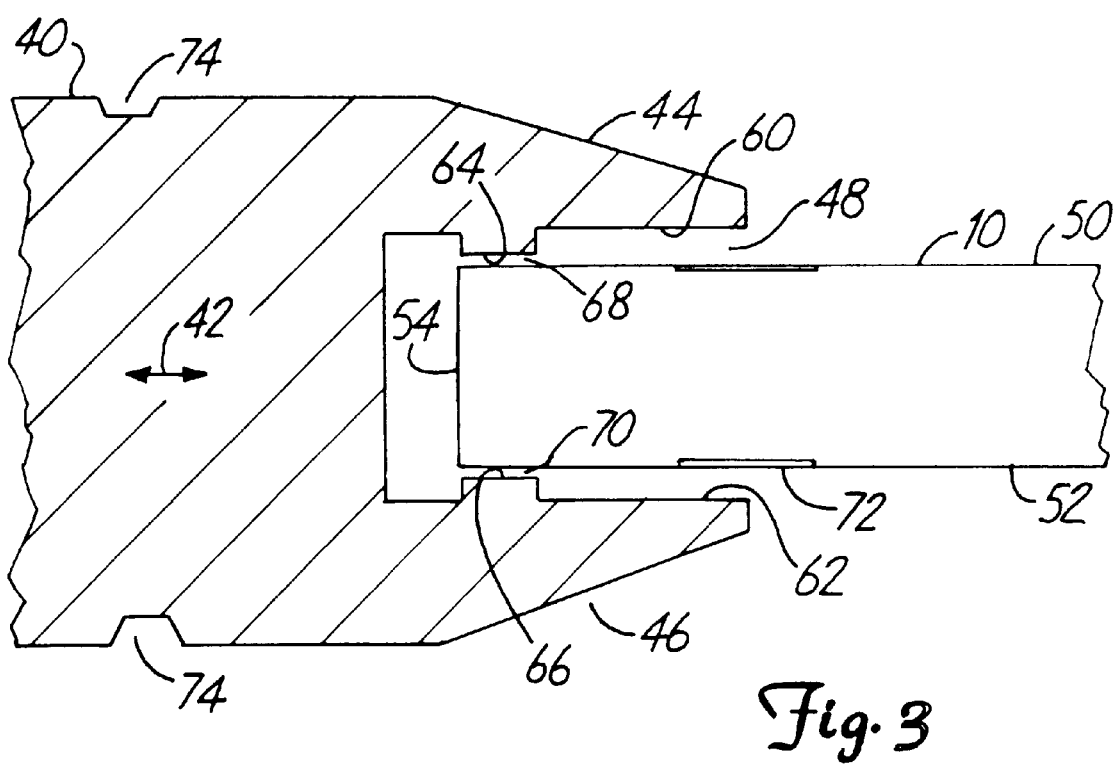
FIG. 3 is a side view of an edge region of a disc within a load/unload ramp and disc snubbing device in accordance with a second embodiment of the present invention.

FIG. 3 illustrates a modification of the embodiment of FIG. 2, with buttons 64 and 66 positioned within snubber slot 48 to engage regions 100 and 102 at the edge of disc 10 radially outward from the outermost data track 72 on the disc. Regions 100 and 102 are the non-glided regions of disc 10 that do not contain data and over which the transducers do not glide or fly. Conveniently, disc 10 does not require the chamfer illustrated in FIG. 2, and the buttons localize disc/snubber contact to regions 100 and 102 to protect the recording surfaces of the discs from damage by the snubber.

Figure 4:
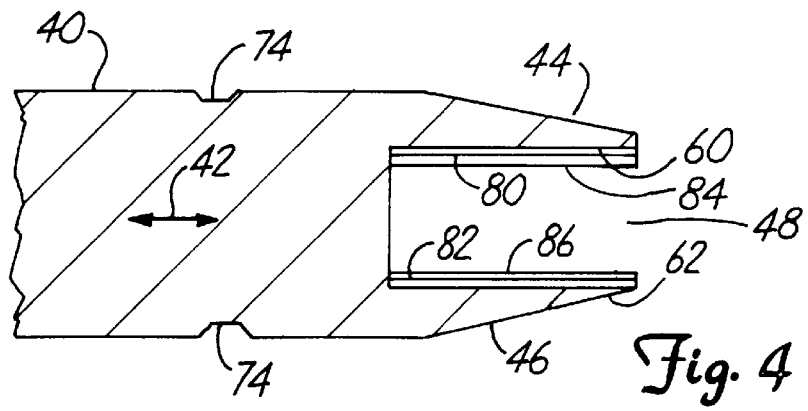
FIGS. 4, 5 and 6 are side views of a load/unload ramp with a snubbing device in accordance with yet other embodiments of the present invention.
Figure 5:
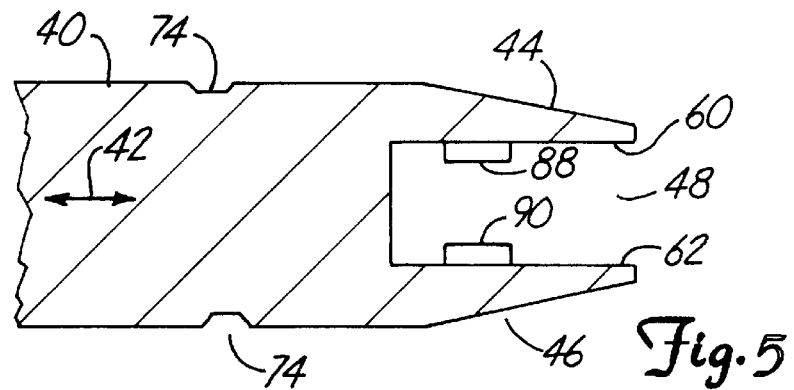
Figure 6:
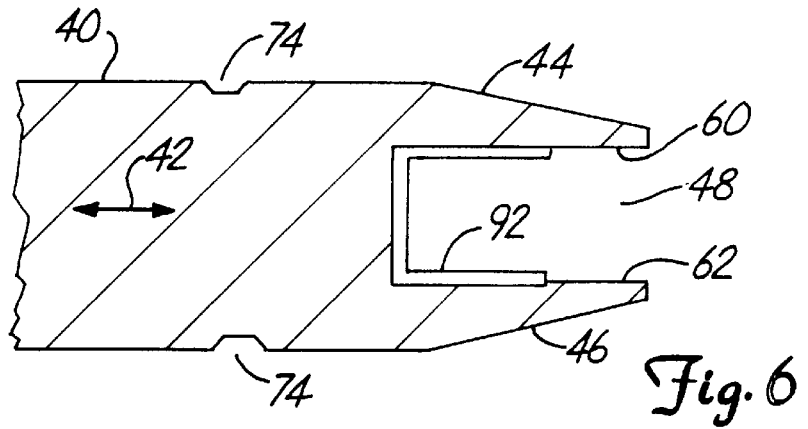

FIGS. 4–6 illustrate additional embodiments of the improved snubber of the present invention. As illustrated in FIG. 4, the entire surface area of surfaces 60 and 62 of slots 48 may include a layer 80 and 82 of energy absorbent material. In this case, it is not necessary that the edges of discs 10 and 12 be chamfered as illustrated in FIG. 2, but instead the energy absorbent material of layers 80 and 82 provides a soft cushion for contact with the recording surfaces of the disc. In this case, the thickness of the absorbent material is such that the space between the material and the disc surface is of the order of one mil on each side. Additionally, a layer 84 and 86 of inert material may overlie the energy absorbent material to avoid damage to the recording surface. Alternatively, the inert material may be used in place of the energy absorbent material.

As illustrated in FIG. 5, buttons 88 and 90, formed of energy absorbent material may be fastened to surfaces 60 and 62 in the same positions as the buttons illustrated in FIGS. 2 or 3. Buttons 88 and 90 serve the same purpose as buttons 64 and 66 in FIGS. 2 and 3, except that buttons 88 and 90 additionally provide energy absorption in the event of shock to the disc drive. As shown in FIG. 6, the surfaces 60 and 62 may be coated with a layer 92 of energy absorbent material extending from the back wall of the slot forwardly to occupy the regions occupied by buttons 88 and 90 in FIG. 5 to engage the chamfer surfaces 56 and 58 or non-glided regions 100 and 102 of the discs.

Although the present invention has been described with reference to preferred embodiments, workers skilled in the art will recognize that changes may be made in form and detail without departing from the spirit and scope of the invention.

What is claimed is:

1. A ramp for loading and unloading a transducer into and out of operational relation with a recording surface of a disc, the transducer being supported on a movable actuator arm, the ramp including
   a ramp surface for engaging the actuator arm to lift the transducer from operational relation with the disc surface, and
   means for absorbing shock and preventing axial movement of an edge of the disc from exceeding a design limit without affecting the recording surface.

2. A disc drive having:
   at least one rigid disc rotatable about a disc axis, the disc having at least one recording surface;
   an actuator assembly having at least one transducer mounted to an actuator arm, the actuator assembly being operable to position the transducer adjacent selected locations on the recording surface; and
   a ramp for loading and unloading the transducer into and out of operational relation with the disc surface, the ramp including
      a housing,
      a ramp surface on the housing for engaging the actuator arm to lift the transducer from operational relation with the disc surface, and
      a snubbing mechanism preventing axial movement of an edge of the disc from exceeding a design limit, the snubbing mechanism including
         a slot in the housing adjacent the ramp surface, the slot having opposite spaced surfaces parallel to the recording surface and positioned relative to the disc so that the disc is loosely received in the slot and does not engage the slot surfaces during normal operation of the disc drive, and
         a shock absorber supported within the slot on both of the slot surfaces to engage the disc only when the edge of the disc moves to the design limit without affecting the recording surface.

3. The disc drive of claim 2, wherein the housing is movable between a first position where the edge of the disc is received in the slot and the actuator assembly is operable to move the arm to engage the ramp to lift the transducer from the recording surface, and a second position where the edge of the disc is free of the slot and the arm cannot engage the ramp.

4. The disc drive of claim 2, wherein the disc includes a chamfer surface between the recording surface and the edge of the disc, and the shock absorber comprises a button protruding from the respective slot surface to engage the chamfer surface when the edge of the disc moves the design limit.

5. The disc drive of claim 4, wherein the button is formed of an energy absorbent material.

6. The disc drive of claim 2, wherein the disc includes a chamfer surface between the recording surface and the edge of the disc, and the shock absorber comprises a compliant layer on the respective slot surface arranged to engage the chamfer surface when the edge of the disc moves the design limit.

7. The disc drive of claim 6, wherein the compliant layer is formed of an energy absorbent material.

8. The disc drive of claim 2, wherein the shock absorber comprises an inert layer on the respective slot surface arranged to engage the recording surface when the edge of the disc moves the design limit.

9. A ramp for loading and unloading a transducer into and out of operational relation with a recording surface of a disc rotatable about an axis of a disc drive, the transducer being supported on a movable actuator arm, the ramp including
   a housing,
   a ramp surface on the housing for engaging the actuator arm to lift the transducer from operational relation with the disc surface, and
   a snubbing mechanism preventing axial movement of an edge of the disc from exceeding a design limit, the snubbing mechanism including
      a slot in the housing adjacent the ramp surface, the slot having opposite spaced surfaces parallel to the recording surface and positioned relative to the disc so that the disc is loosely received in the slot and does not engage the slot surfaces during normal operation of the disc drive, and
      a shock absorber supported within the slot on both of the slot surfaces to engage the disc only when the edge of the disc moves to the design limit without affecting the recording surface.

10. The ramp of claim 9, wherein the shock absorber comprises an inert layer on the respective slot surface arranged to engage the recording surface when the edge of the disc moves the design limit.

11. The ramp of claim 9, wherein the housing is movable between a first position where the edge of the disc is received in the slot and the actuator arm engages the ramp to lift the transducer from the recording surface, and a second position where the edge of the disc is free of the slot and the actuator arm cannot engage the ramp.

12. The ramp of claim 9, wherein the disc includes a chamfer surface between the recording surface and the edge of the disc, and the shock absorber comprises a button protruding from the respective slot surface to engage the chamfer surface when the edge of the disc moves the design limit.

13. The ramp of claim 12, wherein the button is formed of an energy absorbent material.

14. The ramp of claim 9, wherein the disc includes a chamfer surface between the recording surface and the edge of the disc, and the shock absorber comprises a compliant layer on the respective slot surface arranged to engage the chamfer surface when the edge of the disc moves the design limit.

15. The ramp of claim 14, wherein the compliant layer is formed of an energy absorbent material.

* * * * *